US012603270B2

(12) United States Patent
Sato et al.

(10) Patent No.: US 12,603,270 B2
(45) Date of Patent: Apr. 14, 2026

(54) LITHIUM-ION BATTERY ELECTRODEPOSITION DETECTION METHOD

(71) Applicant: HONDA MOTOR CO., LTD., Tokyo (JP)

(72) Inventors: Kenji Sato, Wako (JP); Atsushi Tamai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 603 days.

(21) Appl. No.: 17/991,942

(22) Filed: Nov. 22, 2022

(65) Prior Publication Data

US 2023/0187603 A1 Jun. 15, 2023

(30) Foreign Application Priority Data

Dec. 14, 2021 (JP) ................................ 2021-202348

(51) Int. Cl.
*H01M 4/04* (2006.01)
*H01M 4/02* (2006.01)
(Continued)

(52) U.S. Cl.
CPC ......... *H01M 4/045* (2013.01); *H01M 4/0404* (2013.01); *H01M 4/382* (2013.01);
(Continued)

(58) Field of Classification Search
CPC .... H01M 4/045; H01M 4/0404; H01M 4/382; H01M 10/0525; H01M 2004/027; H01M 2004/028
See application file for complete search history.

(56) References Cited

U.S. PATENT DOCUMENTS

2012/0148880 A1 6/2012 Schaefer et al.
2016/0061908 A1 3/2016 Torai et al.
(Continued)

FOREIGN PATENT DOCUMENTS

CN 110873844 3/2020
CN 111239630 6/2020
(Continued)

OTHER PUBLICATIONS

Mattei, Gerard S., et al. "High-energy lateral mapping (HELM) studies of inhomogeneity and failure mechanisms in NMC622/Li pouch cells." Chemistry of Materials 33.7 (2021): 2378-2386. Published Mar. 22, 2021 (Year: 2021).*
(Continued)

*Primary Examiner* — Galen H Hauth
(74) *Attorney, Agent, or Firm* — Amin, Turocy & Watson, LLP

(57) ABSTRACT

A lithium-ion battery electrodeposition detection method includes: a positive-electrode SOC map generation step of irradiating a lithium-ion battery with an X-ray, performing an X-ray diffraction measurement of a positive-electrode active material layer, and generating a positive-electrode SOC map that indicates a distribution of a charging depth along a thickness direction of the positive-electrode active material layer; a SOC difference value detection step of detecting a SOC difference value which is a difference between a maximum value and a minimum value of the positive-electrode SOC map; and a determination step of comparing the SOC difference value with a preset threshold value and determining a presence or absence of a lithium electrodeposition of a negative-electrode active material layer.

4 Claims, 3 Drawing Sheets

(51) Int. Cl.
 *H01M 4/38*       (2006.01)
 *H01M 10/0525*     (2010.01)
(52) U.S. Cl.
 CPC .. *H01M 10/0525* (2013.01); *H01M 2004/027*
      (2013.01); *H01M 2004/028* (2013.01)

(56)          References Cited

U.S. PATENT DOCUMENTS

| | | | |
|---|---|---|---|
| 2016/0123906 A1 | 5/2016 | Tessema et al. | |
| 2020/0072909 A1 | 3/2020 | Soejima et al. | |

FOREIGN PATENT DOCUMENTS

| | | |
|---|---|---|
| JP | 02-012776 | 1/1990 |
| JP | 2001-339864 | 12/2001 |
| JP | 2012-003863 | 1/2012 |
| JP | 2012-524385 | 10/2012 |
| JP | 2013-089363 | 5/2013 |
| JP | 2014-036009 | 2/2014 |
| JP | 5590514 | 9/2014 |
| JP | 2015-138730 | 7/2015 |
| JP | 2016-053564 | 4/2016 |
| JP | 2017-147161 | 8/2017 |
| JP | 2019-145342 | 8/2019 |
| JP | 2021-162495 | 10/2021 |

OTHER PUBLICATIONS

Li, Zhuo, et al. "Synchrotron operando depth profiling studies of state-of-charge gradients in thick Li (Ni0. 8Mn0. 1Co0. 1) O2 cathode films." Chemistry of Materials 32.15 (2020): 6358-6364. (Year: 2020).*

Liu, Jun, et al. "Visualization of charge distribution in a lithium battery electrode." The Journal of Physical Chemistry Letters 1.14 (2010): 2120-2123. (Year: 2010).*

Nanda, Jagjit, et al. "Local state-of-charge mapping of lithium-ion battery electrodes." Advanced Functional Materials 21.17 (2011): 3282-3290. (Year: 2011).*

Liu, Qianqian, et al. "Understanding undesirable anode lithium plating issues in lithium-ion batteries." RSC advances 6.91 (2016): 88683-88700 (Year: 2016).*

Japanese Notice of Allowance for Japanese Patent Application No. 2021-202348 dated Nov. 5, 2024.

Yamamoto, et al. "The visualization technology of a rechargeable lithium-ion battery and electrode reaction nature", SCAS News, Sumika Chemical Analysis Service, Ltd., Feb. 27, 2015, 2015-I (vol. 41) pp. 7-10 https://www.scas.co.jp/scas-news/sn-backissues/pdf/41/SCASNEWS2015-1_web_p7-10.pdf.

Chinese Office Action for Chinese Patent Application No. 202211512783.2 mailed Aug. 26, 2025.

\* cited by examiner

LITHIUM-ION BATTERY ELECTRODEPOSITION DETECTION METHOD

CROSS-REFERENCE TO RELATED APPLICATION

Priority is claimed on Japanese Patent Application No. 2021-202348, filed on Dec. 14, 2021, the contents of which are incorporated herein by reference.

BACKGROUND

Field of the Invention

The present disclosure relates to a lithium-ion battery electrodeposition detection method that detects a lithium electrodeposition which occurs at a negative-electrode active material layer of a lithium-ion battery.

Background

An electric capacitor that supplies electric power to a motor or the like is provided on a vehicle such as an EV (Electric Vehicle) or a HEV (Hybrid Electrical Vehicle). A plurality of secondary batteries are provided on the electric capacitor.

Although a predetermined output is required for the secondary battery provided on the EV or the HEV, generally, if the secondary battery is not cleaned or maintained for a medium to long period of time, an oxide film may form on a surface of an electrode of the secondary battery, and thereby, the output performance decreases.

When the output performance by the secondary battery is decreased in this way, generally, it is determined that the output performance is degraded, and a control is performed such that the output by the secondary battery is reduced. This is because if an output before degradation is required despite the secondary battery being degraded, the secondary battery is overloaded, and the lifetime degradation of the secondary battery is accelerated.

In order to resolve the degradation of the secondary battery, it is necessary to perform an activation process of the secondary battery by performing a predetermined discharge process with respect to the secondary battery, that is, a so-called refresh process; however, it is not assumed that with respect to the EV or the HEV, the activation process is performed while the secondary battery is mounted on the vehicle. Therefore, for example, Japanese Unexamined Patent Application, First Publication No. 2001-339864 discloses that when a lead battery is used as the secondary battery, a use range of a SOC (State of Charge) increases at the time of degradation.

On the other hand, a lithium-ion battery (LIB) is widely used for a secondary battery for the EV and the HEY. Since the lithium-ion battery is lightweight, and a high energy density can be obtained, the lithium-ion battery is preferably used as a high-output-power electric source for being provided on a vehicle.

A carbon material such as graphite is generally used as a negative-electrode active material of the lithium-ion battery, and at the time of charging, a lithium ion enters a space between layers in the carbon material, and thereby, the potential changes. However, depending on the charging situation of the lithium-ion battery, a metal lithium may deposit on the negative-electrode active material (lithium electrodeposition).

Since it is known that when such a lithium electrodeposition occurs, capacity degradation of the lithium-ion battery occurs, a control is performed such that charging is performed within a range of a preset upper limit voltage. Here, the lithium electrodeposition refers to the lithium-ion being electrically reduced and thereby deposits on a negative electrode surface as a lithium metal. Accordingly, when the lithium-ion battery becomes degraded, a problem occurs in that a charging amount or a regeneration output is reduced compared to the new lithium-ion battery, and a travel distance is shortened. Therefore, a technique that detects the generation of the lithium electrodeposition has been proposed.

For example, Japanese Unexamined Patent Application, First Publication No. 2012-003863 discloses a method of detecting the presence or absence of a lithium electrodeposition by detecting the presence or absence of a local minimum point which is a point that indicates a local minimum value at which the charging current shifts from a decrease to an increase.

Further, Japanese Unexamined Patent Application, First Publication No. 2013-089363 discloses a method of detecting a change amount per unit of time of a battery voltage that is gradually increased by a constant current charging, and detecting the presence or absence of a lithium electrodeposition from the vicinity of a local minimum value of the change amount per time of the battery voltage.

Further, Japanese Unexamined Patent Application, First Publication No. 2019-145342 discloses a method of detecting the presence or absence of a lithium electrodeposition by detecting a change in the thickness of a battery case.

SUMMARY

However, according to each of the methods disclosed in Japanese Unexamined Patent Application, First Publication No. 2012-003863, Japanese Unexamined Patent Application, First Publication No. 2013-089363, and Japanese Unexamined Patent Application, First Publication No. 2019-145342, only the presence or absence of the occurrence of a lithium electrodeposition can be detected, and a plane distribution of the lithium electrodeposition in a negative-electrode active material layer cannot be comprehended. Therefore, there is a problem in that it is not possible to know a presage of the occurrence of the lithium electrodeposition, and it is not possible to perform an effective control for preventing the occurrence of the lithium electrodeposition.

An object of an aspect of the present invention is to provide a lithium-ion battery electrodeposition detection method capable of improving an energy efficiency of a lithium-ion battery by detecting a plane distribution of a lithium electrodeposition in a negative-electrode active material layer of the lithium-ion battery and detecting a presage of the occurrence of the lithium electrodeposition.

From the background described above, the present inventor has discovered that by using a positive-electrode SOC map obtained by mapping a distribution of a charging depth (SOC) of a positive-electrode active material layer, it is possible to detect the presage of the occurrence of the lithium electrodeposition of a negative-electrode active material layer with high accuracy.

A lithium-ion battery electrodeposition detection method according to an aspect of the present invention detects a lithium electrodeposition which occurs at a negative-electrode active material layer of a lithium-ion battery in which a positive electrode having a positive-electrode collector body and a positive-electrode active material layer located on at least one surface of the positive-electrode collector body, a negative electrode facing the positive electrode and having a negative-electrode collector body and the negative-electrode active material layer located on at least one surface of the negative-electrode collector body, and an electrolyte layer located between the positive electrode and the negative electrode are layered, the lithium-ion battery electrodeposition detection method including: a positive-electrode SOC map generation step of irradiating the lithium-ion battery with an X-ray, performing an X-ray diffraction measurement of the positive-electrode active material layer, and generating a positive-electrode SOC map that indicates a distribution of a charging depth along a thickness direction of the positive-electrode active material layer; a SOC difference value detection step of detecting a SOC difference value which is a difference between a maximum value and a minimum value of the positive-electrode SOC map; and an electrodeposition determination step of comparing the SOC difference value with a preset threshold value and determining a presence or absence of a lithium electrodeposition of the negative-electrode active material layer.

According to the aspect of the present invention, by generating the positive-electrode SOC map of the positive-electrode active material layer for which a measurement by the X-ray diffraction is easily performed compared to a lithium metal or the like of the negative-electrode active material layer since an atomic scattering factor of the X-ray is large, and calculating the SOC difference value which is a difference between the maximum value and the minimum value of the charging depth (SOC) in such a positive-electrode SOC map, it becomes possible to easily detect the presage of the occurrence of the lithium electrodeposition in the negative-electrode active material layer or that the lithium electrodeposition is actually occurring. Thereby, it is possible to improve the energy efficiency of the lithium-ion battery.

In the aspect described above, in the electrodeposition determination step, the threshold value may be set to 15%, and it may be determined that the lithium electrodeposition occurs in the negative-electrode active material layer in a case where the SOC difference value is 15% or more.

In the aspect described above, in the positive-electrode SOC map generation step, the X-ray used for the X-ray diffraction measurement may be a high-energy X-ray having an energy of 40 keV or more.

According to the aspect of the present invention, it is possible to provide a lithium-ion battery electrodeposition detection method capable of detecting a plane distribution of the lithium electrodeposition in the negative-electrode active material layer of the lithium-ion battery and detecting the presage of the occurrence of the lithium electrodeposition.

DESCRIPTION OF EMBODIMENTS

Hereinafter, a lithium-ion battery electrodeposition detection method according to an embodiment of the present invention will be described with reference to the drawings. The embodiment shown below is specifically described for better understanding of the scope of the invention and does not limit the invention unless otherwise specified. Further, the drawings used in the following description, in order to make a feature of the present invention easy to understand, a main portion may be enlarged for convenience, and the dimensional ratio or the like of each component is not necessarily the same as the actual dimensional ratio.

(Lithium-Ion Battery)

First, a layer configuration of a common lithium-ion battery is described.

Figure 1:
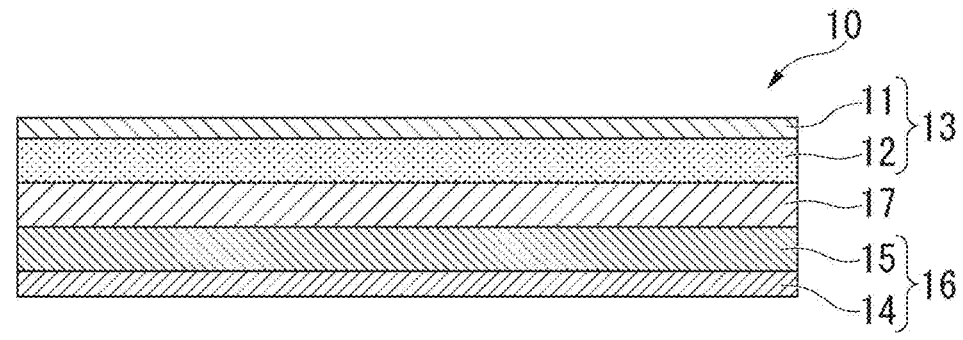
FIG. 1 is a schematic cross-sectional view showing an example of a layer configuration of a lithium-ion battery.

FIG. 1 is a schematic cross-sectional view showing an example of a layer configuration of a lithium-ion battery.

A lithium-ion battery (LIB) 10 is formed such that a positive electrode 13 having a positive-electrode collector body 11 and a positive-electrode active material layer 12 located on one surface of the positive-electrode collector body 11, a negative electrode 16 facing the positive electrode 13 and having a negative-electrode collector body 14 and a negative-electrode active material layer 15 located on one surface of the negative-electrode collector body 14, and an electrolyte layer 17 located between the positive electrode 13 and the negative electrode 16 are layered.

The positive-electrode active material layer 12 has a positive-electrode active material and a binder and has, if necessary, a conductive auxiliary agent. An electrode active material that is able to reversibly advance absorbing and releasing of an ion, desorption and insertion (intercalation) of an ion, or doping and dedoping of an ion and a counter anion (for example, $PF_6^-$) of the ion can be used for the positive-electrode active material.

Specific examples of the positive-electrode active material include, for example, a lithium cobaltate ($LiCoO_2$), a lithium nickelate ($LiNiO_2$), a lithium manganate ($LiMnO_2$), a lithium manganese spinel ($LiMn_2O_4$), a combined metal oxide represented by a general formula: $LiNi_xCo_yMn_zM_aO_2$ ($x+y+z+a=1$, $0 \le x<1$, $0 \le y<1$, $0 \le z<1$, $0 \le a<1$, M is an element of one or more types selected from Al, Mg, Nb, Ti, Cu, Zn, and Cr), a lithium vanadium oxide ($LiV_2O_5$), an olivine-type $LiMPO_4$ (here, M represents an element of one or more types selected from Co, Ni, Mn, Fe, Mg, Nb, Ti, Al, and Zr, or VO), a lithium titanate ($Li_4Ti_5O_{12}$), a combined metal oxide such as $LiNi_xCo_yAl_zO_2$ ($0.9<x+y+z<1.1$), a polyacetylene, a polyaniline, a polypyrrole, a polythiophene, a polyacene, and the like.

Examples of the conductive auxiliary agent include a carbon powder such as a carbon black, a carbon nanotube, a carbon material, a copper, a nickel, a stainless steel, a fine metal powder such as an iron, a mixture of a carbon material and a fine metal powder, and a conductive oxide such as an ITO. When a sufficient conductive property is ensured only by the positive-electrode active material, the positive-electrode active material layer 12 does not have to include the conductive auxiliary agent.

Further, the positive-electrode active material layer 12 may include a binder. A known binder can be used. Examples of the binder include a fluorine resin such as a polyvinylidene fluoride (PVDF), a polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), a polychlorotrifluoroethylene (PCTFE), an ethylene-chlorotrifluoroethylene copolymer (ECTFE), and a polyvinyl fluoride (PVF).

The negative-electrode active material layer 15 has a negative-electrode active material and a binder and has, if necessary, a conductive auxiliary agent. A known negative-electrode active material can be used as the negative-electrode active material. Examples of the negative-electrode active material include a metal lithium, a graphite (a natural graphite or an artificial graphite) capable of absorbing and releasing a lithium ion, a carbon nanotube, a non-graphitizable carbon, an easily graphitizable carbon, a carbon material such as a low-temperature calcined carbon, a metal capable of combining with a lithium such as an aluminum, a silicon, or a tin, an amorphous compound mainly including an oxide such as a $SiO_x$ ($0<x<2$) or a tin dioxide, and a particle including a lithium titanate ($Li_4Ti_5O_{12}$) or the like.

A conductive auxiliary agent and a binder similar to those of the positive-electrode active material layer 12 can be used as the conductive auxiliary agent and the binder of the negative-electrode active material layer 15. In addition to the binders listed for the positive-electrode active material layer 12, for example, a carboxymethyl cellulose (CMC), a styrene-butadiene rubber (SBR), a polyimide (PI), a polyamide-imide (PAI), a polyacrylic acid (PAA), and the like can be used as the binder used in the negative-electrode active material layer 15.

In the negative electrode 16 that includes such a negative-electrode active material layer 15, when charging the lithium-ion battery 10, a lithium ion enters a space between layers in the carbon material which is an example of the negative-electrode active material, and thereby, the potential changes; however, depending on a charging condition, a lithium electrodeposition in which a metal lithium deposits on such a negative-electrode active material layer 15 occurs, and capacity degradation (capacity decrease) of the lithium-ion battery 10 occurs. The increase of such a lithium electrodeposition is prevented by controlling the charging condition of the lithium-ion battery 10, and it is possible to slow the capacitance degradation of the lithium-ion battery 10. Therefore, it is important to detect the presage of the occurrence of the lithium electrodeposition of the negative electrode 16.

(Electrodeposition Detection Method)

Figure 2:
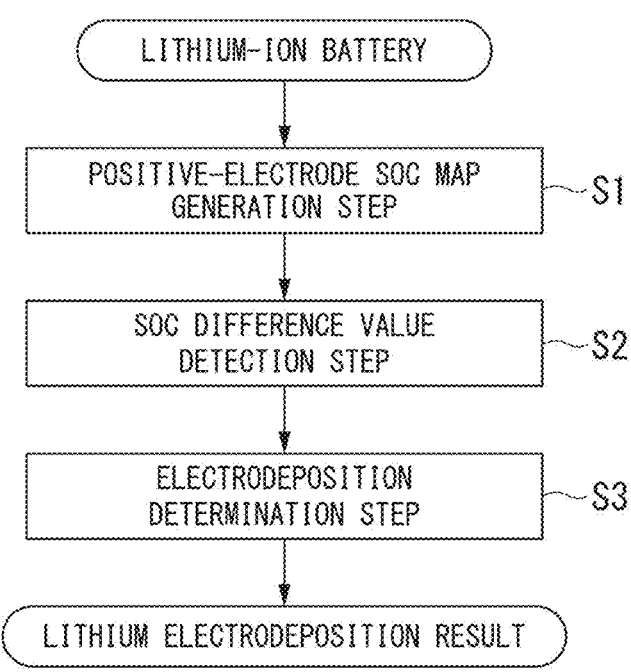
FIG. 2 is a flowchart showing a lithium-ion battery electrodeposition detection method in a step-by-step manner according to an embodiment of the present invention.

FIG. 2 is a flowchart showing a lithium-ion battery electrodeposition detection method in a step-by-step manner according to the embodiment of the present invention.

The lithium-ion battery electrodeposition detection method of the present embodiment includes a positive-electrode SOC map generation step S1, a SOC difference value detection step S2, and an electrodeposition determination step S3.

When detecting the lithium electrodeposition of the lithium-ion battery by the lithium-ion battery electrodeposition detection method according to the present embodiment, first, the lithium-ion battery 10 of which the occurrence of the electrodeposition is to be confirmed is irradiated with an X-ray, and an X-ray diffraction measurement of the positive-electrode active material layer is performed (positive-electrode SOC map generation step S1).

As the X-ray used for the X-ray diffraction measurement, for example, a high energy X-ray (radiation light X-ray) having an energy of 40 keV or more can be preferably used. Such a high-energy radiation light X-ray is radiated toward a lamination direction of the lithium-ion battery. Since the positive-electrode active material layer 12 has a large atomic scattering factor of the X-ray, the measurement by the X-ray diffraction is easily performed compared to the negative-electrode active material layer 15 or the like.

Then, a positive-electrode SOC map that indicates a distribution of a charging depth along a thickness direction of the positive-electrode active material layer 12 is generated based on X-ray diffraction data obtained by the X-ray irradiation onto the lithium-ion battery. The positive-electrode SOC map may be represented, for example, by dividing a charging depth (SOC (%)) by an isopleth line into numerical value ranges of several steps in a cross-section in a thickness direction from one surface of the positive-electrode active material layer 12 toward the other surface, and performing color coding for each range. Such a positive-electrode SOC map can be generated, for example, by inputting the X-ray diffraction data of the positive-electrode active material layer 12 into a computer and using image processing software or the like. An example of such a positive-electrode SOC map is shown in FIG. 3.

Figure 3:
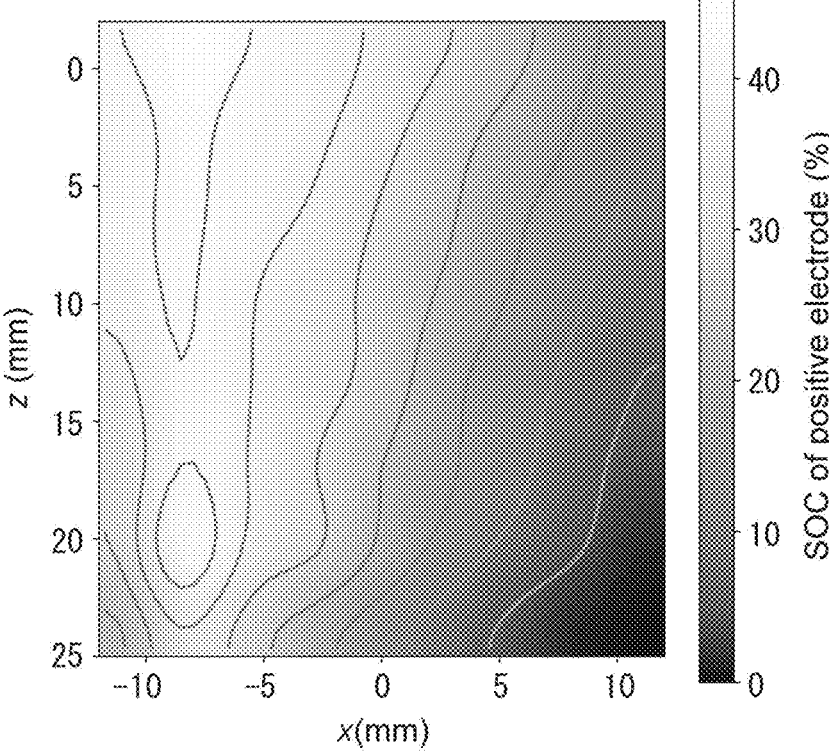
FIG. 3 is an example of a positive-electrode SOC map.

According to an example of the positive-electrode SOC map shown in FIG. 3, it is known that in the positive-electrode active material layer 12, a region having a charging depth (SOC) of about 35% to 45% is formed in a range of −5 mm to −10 mm in an x-direction along one surface from 0 mm to 20 mm in a z-direction which is a thickness direction, and a region having a charging depth (SOC) of about 0% to 10% is formed in a range of 0 mm to 10 mm in the x-direction from 5 mm to 25 mm in the z-direction.

Next, a maximum value and a minimum value of the charging depth (SOC) are extracted from the positive-electrode SOC map obtained in the positive-electrode SOC map generation step S1. Then, a SOC difference value which is a difference between the maximum value and the minimum value of the charging depth (SOC) is calculated (SOC difference value detection step S2). Such a SOC difference value can be easily calculated from the numerical data of the charging depth (SOC) when generating the positive-electrode SOC map.

Then, the SOC difference value obtained in the SOC difference value detection step S2 is compared with a preset threshold value, and the presence or absence of the lithium electrodeposition of the negative-electrode active material layer 15 is determined (electrodeposition determination step S3). In the electrodeposition determination step S3, the threshold value described above is set to, for example, 15%, and when the SOC difference value calculated in the SOC difference value detection step S2 is 15% or more, it is determined that the lithium electrodeposition occurs in the negative-electrode active material layer 15.

As described above, according to the lithium-ion battery electrodeposition detection method of the present embodiment, by generating the positive-electrode SOC map of the positive-electrode active material layer 12 for which a measurement by the X-ray diffraction is easily performed compared to a lithium metal or the like of the negative-electrode active material layer 15 since an atomic scattering factor of the X-ray is large, and calculating the SOC difference value which is a difference between the maximum value and the minimum value of the charging depth (SOC) in such a positive-electrode SOC map, it becomes possible to easily detect the presage of the occurrence of the lithium electrodeposition in the negative-electrode active material layer 15 or that the lithium electrodeposition is actually occurring.

Thereby, it is possible to prevent the decrease in the charging capacity of the lithium-ion battery and extend the lifetime thereof by controlling the charging condition such that the lithium electrodeposition in the negative electrode of the lithium-ion battery does not advance or the like.

In the lithium-ion battery electrodeposition detection method of the present embodiment, if the high-energy radiation light X-ray source used for the X-ray diffraction measurement is downsized, for example, by incorporating such a small X-ray source into an on-vehicle lithium-ion battery, the occurrence of the lithium electrodeposition of the lithium-ion battery can be monitored in real time, and the charging condition can be controlled in accordance with the occurrence situation of the lithium electrodeposition.

Further, the lithium-ion battery electrodeposition detection method of the present embodiment can be applied to any of a variety of lithium-ion batteries in which the electrolyte is a liquid and an all solid lithium-ion battery in which the electrolyte is a solid, and the application is not limited to a particular type of lithium-ion battery.

Although the embodiment of the present invention has been described above, such an embodiment is presented as an example and is not intended to limit the scope of the invention. Such an embodiment can be implemented in various other forms, and a variety of omissions, replacements, or modifications can be made without departing from the scope of the invention. The embodiment and modifications thereof are included in the scope of the invention and are included in the scope of the invention described in the claims and equivalents thereof.

EXAMPLE

The effects of the embodiment of the present invention was verified. For verification, a lithium-ion battery (sample) having a configuration shown in FIG. 1 was prepared. The full charging and discharging for the lithium-ion battery as a sample were repeated a plurality of times.

By irradiating the lithium-ion battery (sample) with a high-energy radiation light X-ray, and an X-ray diffraction measurement of a positive-electrode active material layer was performed by an XRD device.

Then, a positive-electrode SOC map was generated based on an obtained X-ray diffraction result of the positive-electrode active material layer. The positive-electrode SOC map is shown in FIG. 3.

Figure 4:
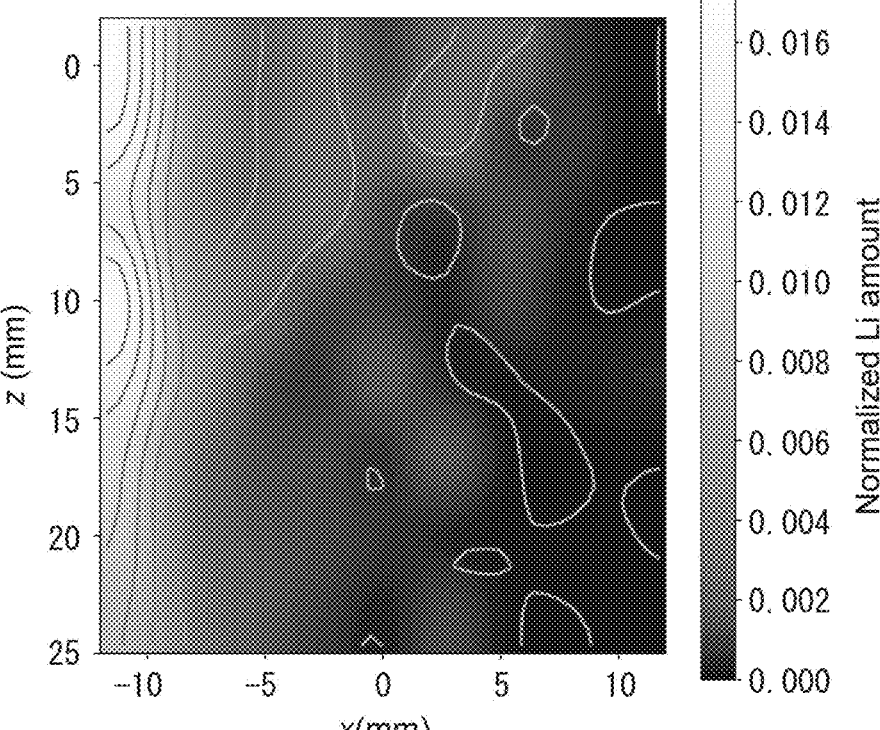
FIG. 4 is a map of a lithium peak intensity of a negative-electrode active material layer.
Figure 5:
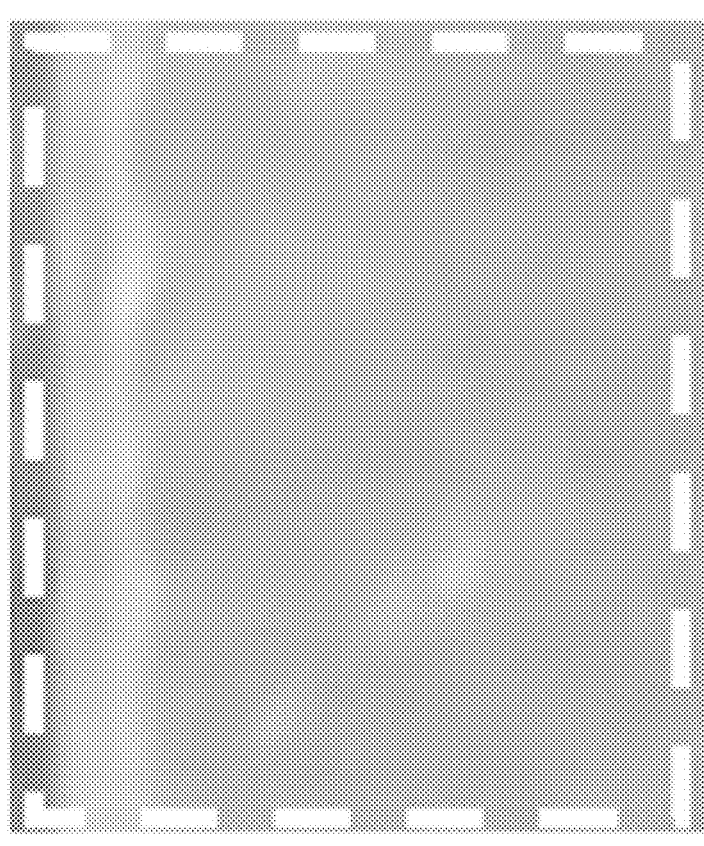
FIG. 5 is an enlarged photograph of the negative-electrode active material layer under visible light.

Next, the lithium-ion battery (sample) was dismantled, the negative-electrode active material layer is removed, an X-ray diffraction measurement of the negative-electrode active material layer was performed by an XRD device, and based on this result, a map of a lithium peak intensity was produced. This map of the lithium peak intensity of the negative-electrode active material layer is shown in FIG. 4. Further, an enlarged photograph of the negative-electrode active material layer under visible light is shown in FIG. 5. In FIG. 5, a portion having a lighter color is a region where more lithium electrodeposition occurs.

By comparing the positive-electrode SOC map of the positive-electrode active material layer shown in FIG. 3 with the map of the lithium peak intensity of the negative-electrode active material layer shown in FIG. 4 and the enlarged photograph of the negative-electrode active material layer shown in FIG. 5, it can be confirmed that in a portion having a high SOC in the positive-electrode SOC map of the positive-electrode active material layer, the lithium electrodeposition occurs in the corresponding negative-electrode active material layer.

Thereby, it was demonstrated that the lithium electrodeposition of the negative-electrode active material layer can be detected based on the positive-electrode SOC map of the positive-electrode active material layer for which the X-ray diffraction measurement is further easily performed than the negative-electrode active material layer.

INDUSTRIAL APPLICABILITY

The lithium-ion battery electrodeposition detection method according to the embodiment of the present invention generates the positive-electrode SOC map of the positive-electrode active material layer for which the X-ray diffraction measurement is further easily performed than the negative-electrode active material layer by using the XRD device and can detect the lithium electrodeposition of the negative-electrode active material layer on the basis of the positive-electrode SOC map. By controlling the charging condition in accordance with such a detection result of the lithium electrodeposition, it becomes possible to prevent the decrease in the charging capacity of the lithium-ion battery and extend the lifetime thereof, and it becomes possible to improve the energy efficiency of the lithium-ion battery. Accordingly, the lithium-ion battery electrodeposition detection methods according to the embodiment of the present invention has the industrial applicability.

What is claimed is:

1. A lithium-ion battery electrodeposition detection method that detects a lithium electrodeposition which occurs at a negative-electrode active material layer of a lithium-ion battery in which a positive electrode having a positive-electrode collector body and a positive-electrode active material layer located on at least one surface of the positive-electrode collector body, a negative electrode facing the positive electrode and having a negative-electrode collector body and the negative-electrode active material layer located on at least one surface of the negative-electrode collector body, and an electrolyte layer located between the positive electrode and the negative electrode are layered, the lithium-ion battery electrodeposition detection method comprising:

a positive-electrode state-of-charge (SOC) map generation step of irradiating the lithium-ion battery with an X-ray, performing an X-ray diffraction measurement of the positive-electrode active material layer, and based on X-ray diffraction data obtained by the X-ray diffraction measurement of the positive-electrode active material layer, generating a positive-electrode SOC map that indicates a distribution of a charging depth representing an SOC along a thickness direction of the positive-electrode active material layer;

an SOC difference value detection step of detecting an SOC difference value which is a difference between a maximum value of the SOC and a minimum value of the SOC in the positive-electrode SOC map generated in the positive-electrode SOC map generation step;

an electrodeposition determination step of comparing the SOC difference value detected in the SOC difference value detection step with a preset threshold value and, based on a first result of the comparing, determining a presence or absence of the lithium electrodeposition of the negative-electrode active material layer; and a controlling step of: based on a second result of the determining of the presence or the absence of the lithium electrodeposition of the negative-electrode active material layer, controlling a charging condition of the lithium-ion battery to mitigate the lithium electrodeposition and degradation of the lithium-ion battery.

2. The lithium-ion battery electrodeposition detection method according to claim 1, wherein in the electrodeposition determination step, the threshold value is set to 15%, and it is determined that the lithium electrodeposition occurs in the negative-electrode active material layer in a case where the SOC difference value is 15% or more.

3. The lithium-ion battery electrodeposition detection method according to claim 1, wherein in the positive-electrode SOC map generation step, the X-ray used for the X-ray diffraction measurement is a high-energy X-ray having an energy of 40 keV or more.

4. The lithium-ion battery electrodeposition detection method according to claim 2, wherein in the positive-electrode SOC map generation step, the X-ray used for the X-ray diffraction measurement is a high-energy X-ray having an energy of 40 keV or more.

* * * * *